United States Patent
Yu et al.

(10) Patent No.: US 11,042,857 B2
(45) Date of Patent: Jun. 22, 2021

(54) OFFLINE TRANSACTION IMPLEMENTATION METHOD AND APPARATUS

(71) Applicant: Advanced New Technologies Co., Ltd., Grand Cayman (KY)

(72) Inventors: Wenwen Yu, Zhejiang (CN); Howing Lee, Zhejiang (CN); Xi Wang, Zhejiang (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 16/779,108

(22) Filed: Jan. 31, 2020

(65) Prior Publication Data
US 2020/0167746 A1 May 28, 2020

Related U.S. Application Data

(63) Continuation of application No. 16/723,362, filed on Dec. 20, 2019, which is a continuation of application No. PCT/CN2018/093026, filed on Jun. 27, 2018.

(30) Foreign Application Priority Data

Jun. 23, 2017 (CN) .......................... 201710487718.1
Jun. 27, 2017 (CN) .......................... 201710500332.X

(51) Int. Cl.
*G06Q 40/00* (2012.01)
*G06Q 20/14* (2012.01)
(Continued)

(52) U.S. Cl.
CPC ........... *G06Q 20/14* (2013.01); *G06K 7/1413* (2013.01); *G06K 7/1417* (2013.01);
(Continued)

(58) Field of Classification Search
None
See application file for complete search history.

(56) References Cited

U.S. PATENT DOCUMENTS 7,747,528 B1 * 6/2010 Robinson ............... G06Q 20/24
705/44
7,904,332 B1 * 3/2011 Merkley, Jr. ........ G06Q 30/0213
705/14.1
(Continued)

FOREIGN PATENT DOCUMENTS

CN 101080737 A 11/2007
CN 104599122 A 5/2015
(Continued)

OTHER PUBLICATIONS

D. Jayasinghe, K. Markantonakis, I. Gurulian, R. N. Akram and K. Mayes, "Extending EMV Tokenised Payments to Offline-Environments," 2016 IEEE Trustcom/BigDataSE/ISPA, Tianjin, 2016, pp. 443-450, doi: 10.1109/TrustCom.2016.0095. (Year: 2016).*

(Continued)

*Primary Examiner* — Rajesh Khattar
(74) *Attorney, Agent, or Firm* — Finnegan, Henderson, Farabow, Garrett & Dunner, LLP

(57) ABSTRACT

An offline transaction implementation method includes: determining, by a payment server in response to a request of a user for registering with a credit transaction service of a merchant, whether credit information of a user account meets a condition, provisioning the credit transaction service of the merchant for the user account when determining that the credit information of the user account meets the condition, and sending account information of the user to a merchant transaction management system; guiding, by the merchant transaction management system after receiving the account information, the user to input a biometric characteristic, and after collecting the biometric characteristic (Continued)

input by the user, storing a binding relationship between the biometric characteristic and the account information into a registered user library of the merchant, prompting the user that the registration succeeds, and controlling a gate of the merchant's store to open for allowing entry of the user.

19 Claims, 4 Drawing Sheets

(51) Int. Cl.
*G06K 7/14* (2006.01)
*G06K 9/00* (2006.01)
*G06Q 20/32* (2012.01)
*G06Q 20/40* (2012.01)
*G06Q 30/04* (2012.01)
*G07C 9/00* (2020.01)

(52) U.S. Cl.
CPC ..... *G06K 9/00926* (2013.01); *G06Q 20/3276* (2013.01); *G06Q 20/4016* (2013.01); *G06Q 20/40145* (2013.01); *G06Q 30/04* (2013.01); *G07C 9/00563* (2013.01)

(56) References Cited

U.S. PATENT DOCUMENTS

| | | | | |
|---|---|---|---|---|
| 8,589,238 | B2* | 11/2013 | Cooper | G07C 9/37 705/18 |
| 9,624,034 | B1 | 4/2017 | Brazeau | |
| 9,654,469 | B1* | 5/2017 | Yang | H04L 63/0861 |
| 10,192,208 | B1* | 1/2019 | Catoe | G07G 1/0009 |
| 2002/0007341 | A1* | 1/2002 | Lent | G06Q 40/025 705/38 |
| 2003/0023557 | A1* | 1/2003 | Moore | G09F 3/00 705/50 |
| 2005/0125674 | A1* | 6/2005 | Nishiki | G07C 9/22 713/182 |
| 2005/0221268 | A1* | 10/2005 | Chaar | G09B 7/02 434/350 |
| 2006/0224504 | A1* | 10/2006 | Nwosu | G06Q 20/327 705/39 |
| 2008/0046366 | A1* | 2/2008 | Bemmel | G06Q 20/3674 705/44 |
| 2010/0097173 | A1* | 4/2010 | Ishige | G07C 9/27 340/5.6 |
| 2013/0232073 | A1* | 9/2013 | Sheets | G06Q 20/40145 705/44 |
| 2013/0262275 | A1* | 10/2013 | Outwater | G06Q 10/02 705/27.1 |
| 2013/0290136 | A1* | 10/2013 | Sheets | G06Q 30/0609 705/26.35 |
| 2014/0101047 | A1* | 4/2014 | Gardiner | G06Q 20/389 705/44 |
| 2014/0316991 | A1* | 10/2014 | Moshal | G06K 7/1417 705/64 |
| 2015/0179007 | A1* | 6/2015 | Todaka | H04B 7/26 340/5.6 |
| 2016/0019545 | A1* | 1/2016 | Vastenavondt | G06Q 20/227 705/44 |
| 2017/0323278 | A1* | 11/2017 | Unnerstall | G06Q 30/0206 |
| 2018/0018687 | A1* | 1/2018 | Ouimet | G06Q 30/0208 |
| 2018/0061155 | A1* | 3/2018 | Ghorpade | G07C 9/00571 |
| 2018/0089688 | A1* | 3/2018 | Kohli | G06Q 20/4016 |
| 2018/0341759 | A1* | 11/2018 | Sato | H04L 9/0894 |
| 2020/0065799 | A1* | 2/2020 | Lu | G06Q 20/3829 |

FOREIGN PATENT DOCUMENTS

| | | |
|---|---|---|
| CN | 104995649 A | 10/2015 |
| CN | 106355464 A | 1/2017 |
| CN | 106570689 A | 4/2017 |
| CN | 106779690 A | 5/2017 |
| CN | 107392614 A | 11/2017 |
| CN | 107451816 A | 12/2017 |

OTHER PUBLICATIONS

International Search Report in International Application No. PCT/CN2018/093026, dated Sep. 27, 2018.

* cited by examiner

OFFLINE TRANSACTION IMPLEMENTATION METHOD AND APPARATUS

CROSS-REFERENCE TO RELATED APPLICATIONS

This application is a continuation application of U.S. application Ser. No. 16/723,362, filed on Dec. 20, 2019, which is a continuation application of International Application No. PCT/CN2018/093026, filed on Jun. 27, 2018, which is based upon and claims priority to Chinese Patent Application No. 201710487718.1, filed on Jun. 23, 2017, and Chinese Patent Application No. 201710500332.X, filed on Jun. 27, 2017, the entire content of all of which is incorporated herein by reference.

TECHNICAL FIELD

This disclosure relates to the field of Internet technologies, and in particular, to an offline transaction implementation method and apparatus.

TECHNICAL BACKGROUND

With the rapid development of Internet technologies, offline physical merchants increasingly solve problems, e.g., provisioning an electronic payment function, allowing a user to pay through a network after consumption, and the like, in the process of production and operation using the Internet technologies. However, the offline physical merchants are still confronted with problems such as high labor cost and low profit.

SUMMARY

In view of this, an offline transaction implementation method and apparatus are provided.

In one embodiment, an offline transaction implementation method includes: determining, by a payment server in response to a request of a user for registering with a credit transaction service of a merchant, whether credit information of a user account meets a condition; provisioning, by the payment server when determining that the credit information of the user account meets the condition, the credit transaction service of the merchant for the user account, and sending account information of the user to a merchant transaction management system; guiding, by the merchant transaction management system after receiving the account information of the user, the user to input a biometric characteristic; and storing, by the merchant transaction management system after collecting the biometric characteristic input by the user, a binding relationship between the biometric characteristic and the account information into a registered user library, prompting the user that the registration succeeds, and controlling a gate of the merchant's store to open for allowing the entry of the user.

In one embodiment, an offline transaction implementation method, applied to a payment server, includes: determining, in response to a request of a user for registering with a credit transaction service of a merchant, whether credit information of a user account meets a condition; provisioning the credit transaction service of the merchant for the user account when determining that the credit information of the user account meets the condition, and sending account information of the user to a merchant transaction management system; receiving bill information sent by the merchant transaction management system, wherein the account information is carried in the bill information; and performing a bill payment operation according to the user account corresponding to the account information.

In one embodiment, an offline transaction implementation method, applied to a merchant transaction management system, includes: receiving account information of a user sent by a payment server after provisioning a credit transaction service of a merchant for a user account in response to a request of a user for registering with a credit transaction service of a merchant during registration of the user with the merchant; guiding the user to input a biometric characteristic after receiving the account information of the user; and storing a binding relationship between the biometric characteristic and the account information into a registered user library of the merchant after collecting the biometric characteristic input by the user, prompting the user that the registration succeeded, and controlling a gate of the merchant's store to open for allowing the entry of the user.

In one embodiment, an offline transaction implementation apparatus includes: a processor; and a memory configured to store machine executable instructions for the processor, wherein by reading and executing the machine executable instructions stored in the memory, the processor performs: determining, in response to a request of a user for registering with a credit transaction service of a merchant, whether credit information of a user account meets a condition; provisioning the credit transaction service of the merchant for the user account when determining that the credit information of the user account meets the condition, and sending account information of the user to a merchant transaction management system; receiving bill information sent by the merchant transaction management system, wherein the account information is carried in the bill information; and performing a bill payment operation according to the user account corresponding to the account information.

As can be seen from the above description, the merchant in the embodiments can allow the user to enjoy services and purchase commodities after provisioning the credit transaction service for the user account, and when the user leaves the store after enjoying the services or purchasing the commodities, the merchant does not need to deploy personnel to supervise the payment behavior of the user, and can deploy an unattended store, thus saving a large amount of human cost.

BRIEF DESCRIPTION OF THE DRAWINGS

The accompanying drawings, which are incorporated in and constitute a part of this specification, illustrate embodiments and, together with the description, serve to explain the principles of the specification.

DETAILED DESCRIPTION

Exemplary embodiments will be described in detail herein, examples of which are illustrated in the accompanying drawings. The following description refers to the accompanying drawings in which the same numerals in different accompanying drawings represent the same or similar elements unless otherwise specified. The implementation manners described in the following exemplary embodiments do not represent all implementation manners consistent with this specification. Instead, they are merely examples of apparatuses and methods consistent with some aspects of this specification as detailed in the appended claims.

Terms used in this specification are merely used for describing particular embodiments but are not intended to limit this specification. Unless otherwise specified clearly in the context, the singular forms "a/an", "the", and "this" used in this application and appended claims are also intended to include the plural forms. It should be further understood that, the term "and/or" used herein refers to and encompasses any or all possible combinations of one or more associated listed items.

It should be understood that although the terms "first," "second," "third," etc. may be used in this specification to describe various types of information, such information should not be limited to these terms. These terms are only used to distinguish the same type of information from each other. For example, the first information may also be referred to as the second information without departing from the scope of this specification. Similarly, the second information may also be referred to as the first information. Depending on the context, the word "if" used herein may be interpreted as "when," "while," or "in response to the determination of."

Figure 1:
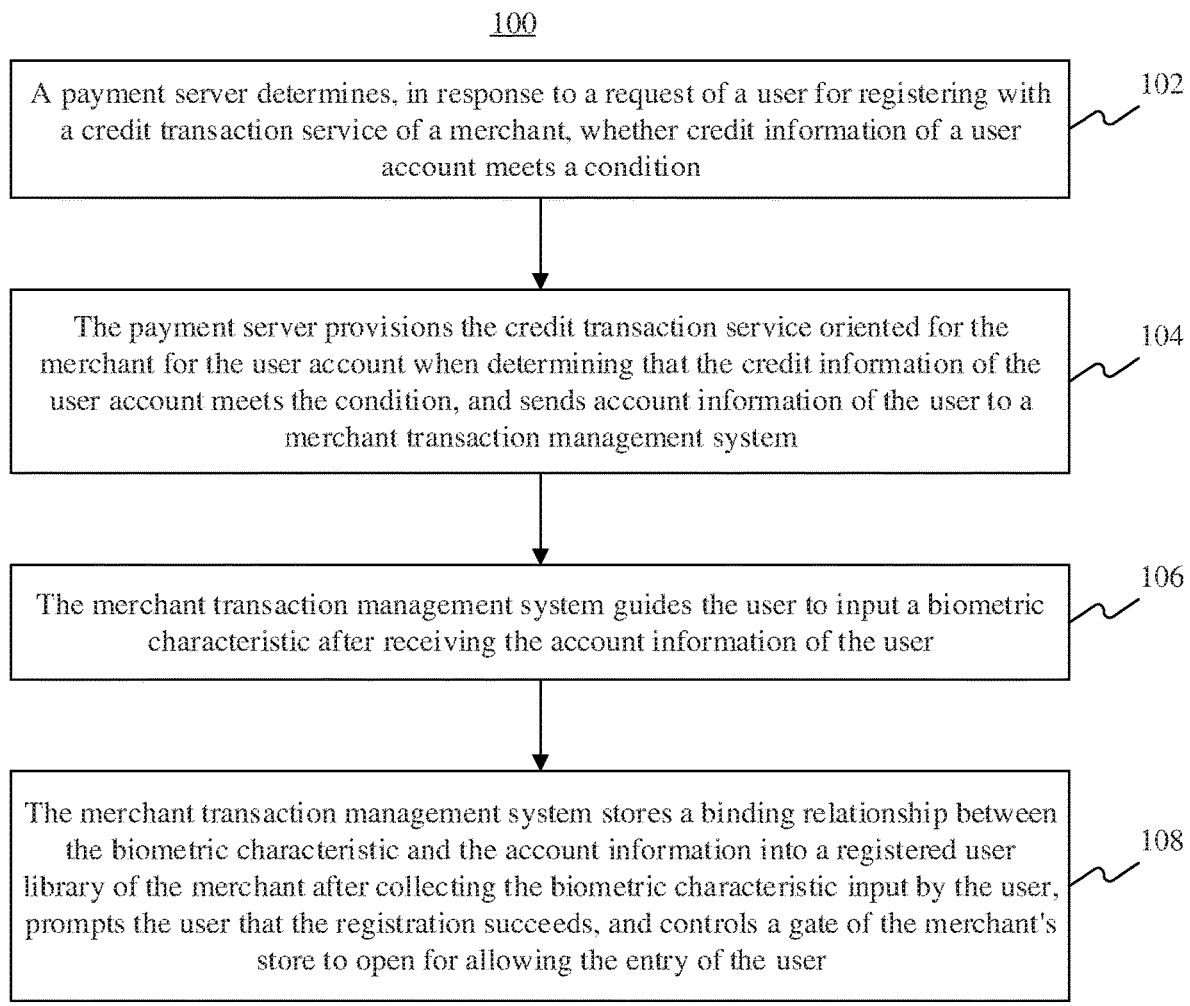
FIG. 1 is a flowchart of an offline transaction implementation method according to an exemplary embodiment.

FIG. 1 is a flowchart of an offline transaction implementation method 100 according to an exemplary embodiment.

In this embodiment, the offline transaction implementation method 100 may be coordinately implemented by a merchant transaction management system and a payment server. The merchant transaction management system may include a biometric characteristic collection apparatus configured to collect a biometric characteristic of a user. The merchant transaction management system may further include a display screen, a machine visual device, and the like, which is not specially limited in this embodiment.

In this embodiment, the merchant transaction management system is usually deployed by a merchant. For example, each merchant has a unique merchant identifier, and the same merchant can deploy one or more stores, and can deploy a corresponding merchant transaction management system for each store. Each merchant transaction management system corresponds to a different merchant transaction management system identifier. The merchant transaction management system identifier may be independent of the merchant identifier, and the merchant transaction management system identifier may also be related to the merchant identifier. For example, the first several bits of the merchant transaction management system identifier represent the merchant identifier, etc., which is not specially limited in this embodiment.

Referring to FIG. 1, the offline transaction implementation method 100 may include the following steps:

In step 102, a payment server determines, in response to a request of a user for registering with a credit transaction service of a merchant, whether credit information of a user account meets a condition.

In step 104, the payment server provisions the credit transaction service oriented for the merchant for the user account when determining that the credit information of the user account meets the condition, and sends account information of the user to a merchant transaction management system.

In this embodiment, when the user conducts shopping, Karaoke or other consumption behaviors for the first time at the merchant, a credit transaction service needs to be registered in advance. For example, the user can implement the registration through the merchant transaction management system.

In one embodiment, a graphic code such as a QR code or a bar code may be posted at a gate of the merchant's store, and the user is prompted to use a payment client to scan the graphic code for registration.

Figure 2:
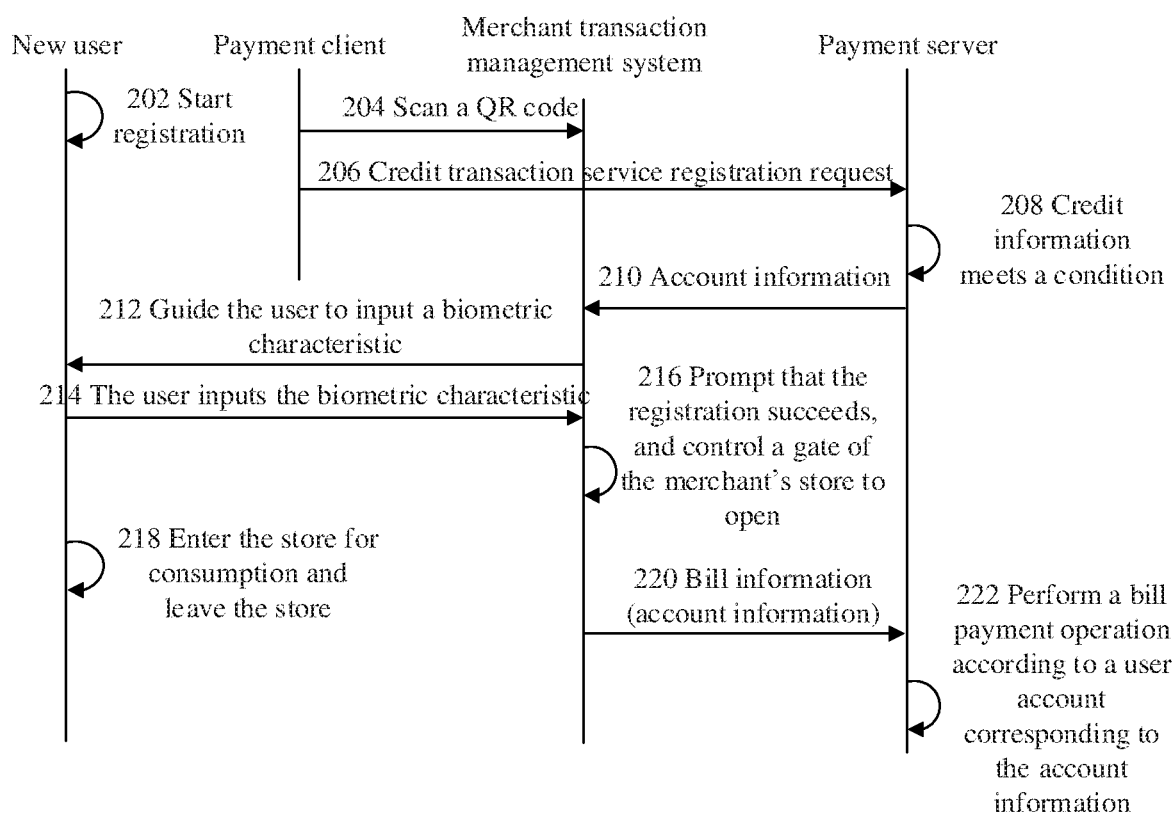
FIG. 2 is a flowchart of another offline transaction implementation method according to an exemplary embodiment.

In another embodiment, referring to FIG. 2, which takes the QR code as an example, a new user may be prompted to register (202) in a touch display screen of the merchant transaction management system, and a QR code may be displayed when the user clicks on a registration button, and the user is prompted to use the payment client to scan the QR code for registration (204).

In this embodiment, information such as a merchant transaction management system identifier and a merchant identifier may be carried in the QR code. The payment client may send a registration request of the credit transaction service to the payment server (206) after scanning the QR code. Information such as a user account that logs in the payment client, the merchant transaction management system identifier, and the merchant identifier is carried in the registration request of the credit transaction service. If the merchant identifier can be parsed from the merchant transaction management system identifier, the merchant identifier may not be carried in the QR code, which is not specially limited in this embodiment.

In this embodiment, the credit transaction service may be separated from a payment operation for the service. The user can leave after enjoying services/purchasing commodities, and subsequently the payment server may perform a deduction operation according to the user account. The merchant does not need to deploy personnel to supervise the user's consumption and payment behaviors, and can deploy unattended stores, e.g., unmanned supermarkets, self-service KTV machines, and the like.

After receiving the credit transaction service registration request, the payment server may determine whether the credit information of the user account meets the condition (208). The condition may be personalized by the merchant, or may be uniformly specified by the payment server. For example, the condition may be that a credit score of the user account is greater than or equal to a score threshold. The credit information of the user account in this embodiment may be understood as the credit information of the user to which the account belongs.

When the payment server determines that the credit information of the user account meets the condition, the credit transaction service oriented for the merchant may be provisioned for the user account, and the account information of the user is returned to the merchant transaction management system according to the merchant transaction management system identifier (210). In some embodiments, after receiving the credit transaction service registration request, the payment server may first guide the user to authorize through the payment client, and may prompt the user to confirm a relevant agreement after determining the user authorization. After confirmation of the user, the step of determining whether the credit information of the user account meets the condition may be performed. The processing and implementation of this part can be known by referring to the related art, thus not being elaborated here.

When determining that the credit information of the user account does not meet the condition, the payment server may return a registration failure message to the payment client to prompt the user. In some embodiments, the payment client may also output a method for improving the credit information for the user to understand.

Referring to FIGS. 1 and 2, in step 106, after receiving the account information of the user, the merchant transaction management system guides the user to input a biometric characteristic.

In this embodiment, after receiving the account information of the user returned by the payment server, the merchant transaction management system can determine the provisioned credit transaction service of the user account, thereby guiding the user to input the biometric characteristic (212).

For example, the merchant transaction management system may output guidance information in the display screen to guide the user to input the biometric characteristic.

As another example, the payment server may also return a provisioning success message to the payment client after provisioning the credit transaction service oriented for the merchant for the user account, and instruct the payment client to guide the user to continue the registration in the merchant transaction management system. For example, the payment client outputs prompt information "Please continue to complete registration on the merchant's screen."

In this embodiment, the biometric characteristic may be a fingerprint, a palm print, a face, an iris, a sclera, etc., which is not specially limited in this embodiment. Taking the palm print as an example, after the user places the palm print, the merchant transaction management system can collect main lines, wrinkles, triangular points, detail points, and other characteristics of the palm print. Taking the face as an example, the merchant trading system can collect facial features.

In step 108, after collecting the biometric characteristic input by the user, the merchant transaction management system stores a binding relationship between the biometric characteristic and the account information into a registered user library of the merchant, prompts the user that the registration succeeds, and controls a gate of the merchant's store to open for allowing the entry of the user. Here, the gate of the merchant's store usually refers to a gate through which the consumer enters the unattended store.

For example, after collecting the biometric characteristic input by the user (214), the merchant transaction management system may store the binding relationship between the biometric characteristic and the account information returned by the payment server into the registered user library of the merchant, and prompt the user that the registration succeeds (216).

In one embodiment, the merchant has several stores, and binding relationships between biometric characteristics and accounts of users registered at various stores are uniformly stored into a registered user library.

In another embodiment, the merchant has several stores each corresponding to a registered user library in which binding relationships between biometric characteristic information of users registered in the store and account information of the users are stored. The merchant's transaction management system can access the registered user library corresponding to each store. The registered user library has an identifier corresponding to the merchant's store. The merchant transaction management system searches for the account information bound to the biometric characteristic in the registered user library corresponding to the store where the user inputs the biometric characteristic. If the account information bound to the biometric characteristic is not found, a registered user library corresponding to another store of the merchant is searched for the account information bound to the biometric characteristic. When the merchant has a large number of registered users, the search can be accelerated.

In yet another embodiment, the registered user library can also be labeled in units of cities. For example, several stores in Hangzhou correspond to a registered user library, and several stores in Beijing correspond to another registered user library.

In this embodiment, after prompting the user that the registration succeeds, the merchant transaction management system may control the gate of the merchant's store to open (216) for allowing the entry of the user (218). Taking an unmanned supermarket as an example, a gate of the unmanned supermarket may be controlled to open for users to enter the supermarket to purchase goods. Taking a self-service KTV as an example, a gate of the self-service KTV machine may be controlled to open for allowing users to enter and sing songs.

In one embodiment, the offline transaction implementation method 100 may further include: after determining that the user has left the store, the merchant transaction management system sends bill information to the payment server (220), wherein the account information is carried in the bill information.

In this embodiment, the merchant transaction management system may determine that the user leaves the store when detecting that the gate of the merchant's store is triggered to open from the inside, calculate the amount of the bill consumed by the user, add the bill amount, the account information of the user, and the like into the bill information and send to the payment server for requesting funds.

Taking an unmanned supermarket as an example, the merchant transaction management system can determine which goods the user has purchased through machine vision, Radio Frequency Identification (RFID) and other technologies, and calculate the total price of the purchased goods. Taking the self-service KTV machine as an example, the merchant transaction management system can determine the duration of song singing of the user according to a time difference between two openings of the gate, and then calculate the amount of money the user needs to spend.

In one embodiment, the offline transaction implementation method 100 may further include: the payment server performs a bill payment operation according to the user account corresponding to the account information.

For example, after receiving the bill information from the merchant transaction management system, the payment server may search for the user account corresponding to the account information carried in the bill information, and then perform the bill payment operation based on the user account (222), for example, pay the bill amount deducted from the user account to the merchant to which the merchant transaction management system belongs.

As can be seen from the above description, the merchant in this embodiment can allow the user to leave the store after consumption after the credit transaction service has been provisioned for the user account, does not need to deploy personnel to supervise user's consumption and payment behaviors, and can deploy unattended shops, thus saving a large amount of labor costs.

Figure 3:
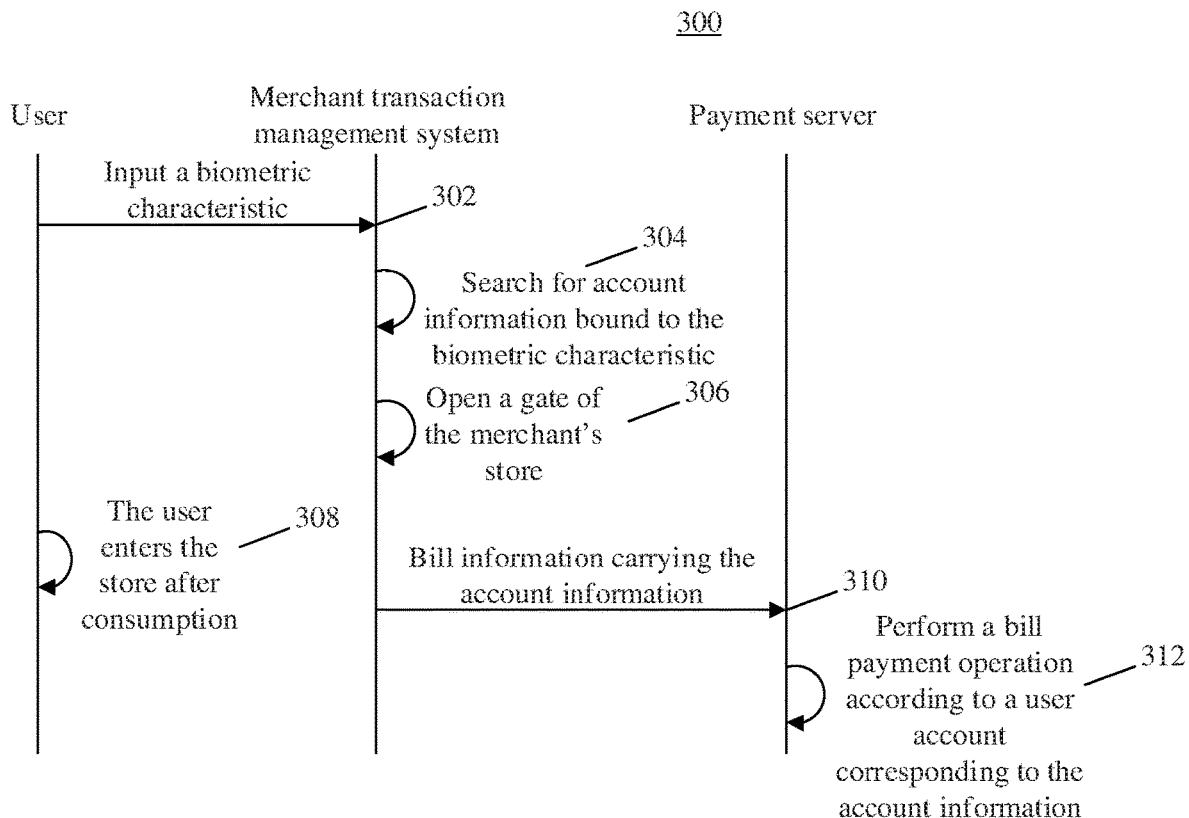
FIG. 3 is a flowchart of a transaction implementation method for a registered user in an offline unattended scenario according to an exemplary embodiment.

FIG. 3 is a flowchart of a transaction implementation method 300 for a registered user in an offline unattended scenario according to an exemplary embodiment. Referring to FIG. 3, the transaction implementation method 300 may include the following steps.

In step 302, the user inputs a biometric characteristic in the merchant transaction management system.

In one embodiment, taking a palm print as an example of the biometric characteristic, the display screen of the merchant transaction management system may output a prompt, for example, "Please register if you're a new user, and please input a palm print if you're an old user."

A registered user can input the palm print used for registration in a palm-print acquisition apparatus of the merchant transaction management system.

In step 304, the merchant transaction management system searches the registered user library for the account information bound to the biometric characteristic.

Based on the above step 302, after the palm print of the user is collected in a non-registration process, the registered user library may be searched for the account information bound to the palm print.

In another embodiment, taking a human face as an example of the biometric characteristic, the merchant transaction management system may first search the registered user library for the facial characteristic information matching the collected facial characteristic based on a face matching algorithm, and then determine the account information bound to the matching facial characteristic information. For example, the face matching algorithm may be: an Eigenface algorithm (Eigenface), a Local Binary Patterns (LBP), etc., which is not specially limited in this embodiment. Also for example, live body face recognition can be performed in a variety of manners, such as active live face detection technology and passive live face detection technology. The active live face detection technology may require the user to perform specific live actions such as blinking, turning head, opening mouth, etc. according to instructions during face recognition, so that a live detecting module can determine whether the operator is a live body according to whether the operator accurately completes the live actions. The passive live face detection technology does not require the user to complete the live actions, achieves better user experience, but is high in technical difficulty since the live detection is performed mainly based on input single-frame image information or information of another device sensor. For example, a single deep learning model is trained under supervision by using live and non-live face collection images, and then the trained model is used for live face prediction on an input single-frame image. In addition, two deep learning models can be used for live face detection.

In one embodiment, if the merchant deploys a registered user library, the registered user library may be searched for account information bound to the palm print. If it is found, step 306 can be performed. If it is not found, the user may be prompted to re-input the palm print. If the user account corresponding to the palm print input by the user is not found for a consecutive preset number of times, it can be determined that the user has not registered yet, and the user can be prompted to register.

In another embodiment, if the merchant deploys multiple registered user libraries, the merchant transaction management system may first search for the account information bound to the palm print in a registered user library corresponding to the store where the palm print is collected. If the account information is not found, a registered user library corresponding to another store may be further searched. If the account information bound to the palm print is not found in all the registered user libraries deployed by the merchant, the user may be prompted to re-input the palm print or prompted to register.

In step 306, when finding the account information bound to the biometric characteristic, the merchant transaction management system may control a gate of the merchant's store to open for allowing the entry of the user.

In step 308, the user enters the merchant's store for consumption.

In step 310, after determining that the user leaves the store, the merchant transaction management system sends bill information to the payment server, wherein the account information bound to the biometric characteristic is carried in the bill information.

In step 312, the payment server performs a bill payment operation based on the user account corresponding to the account information.

As can be seen from the above description, the registered user in this embodiment can implement offline transactions through the biometric characteristic without using a terminal device, which is convenient and quick.

Based on the above embodiment shown in FIG. 1 or FIG. 3, when the user enters the store to enjoy services/purchase commodities and it is determined that the user has not left the store, the merchant transaction management system may prohibit collection of user biometric characteristics to prevent other users from entering.

In one embodiment, when the user enters the store to enjoy services/purchase commodities and it is determined that the user has not left the store, the merchant transaction management system may control the biometric characteristic collection apparatus to stop collecting user biometric characteristics. For example, prompt information such as "There are users shopping in the store, please wait" may further be output in the display screen of the merchant transaction management system.

In another embodiment, when the user enters the store to enjoy services/purchase commodities and it is determined that the user has not left the store, the merchant transaction management system may not perform operations such as saving and querying about a binding relationship, thereby ensuring that no other user can enter.

In some embodiments, when the user enters the store to enjoy services/purchase commodities and it is determined that the user has not left the store, the merchant transaction management system may also adopt other manners to prevent other users from entering, which is not limited here.

Based on the above embodiment shown in FIG. 1 or FIG. 3, after receiving the bill information sent by the merchant transaction management system, the payment server may first determine whether the bill information complies with a preset security policy, and if yes, perform a bill payment operation, otherwise, the payment server may suspend the bill payment operation, and send the bill information to the user account corresponding to the account information for confirmation of the user. If the user confirms the bill, the payment operation may be performed. If the user has any objection to the bill, the merchant can be requested to confirm the bill to ensure the security of the user's property.

In one embodiment, when provisioning the credit transaction service oriented for the merchant for the user account, the payment server may return a service provisioning identifier to the merchant transaction management system, for example, return the service provisioning identifier and the account information to the account transaction system. The service provisioning identifier corresponds to the user account and the merchant, and may be generated when the credit transaction service is provisioned.

After receiving the service provisioning identifier, the merchant transaction management system may store a correspondence between the service provisioning identifier and the account information. For example, the correspondence is also stored into the registered user library of the merchant. When the merchant transaction management system requests funds, it can also add information such as the stored service provisioning identifier corresponding to the account information and the merchant identifier into the bill information.

In this embodiment, the security policy includes that the account information carried in the bill information matches the user account corresponding to the service provisioning identifier, and the merchant identifier carried in the bill information matches the merchant corresponding to the service provisioning identifier.

For example, it is assumed that the payment server provisions a credit transaction service oriented for a merchant 1 for a user 1, a service provisioning identifier is HJK, and the service provisioning identifier is corresponding to a user account 1 of the user 1 and the merchant 1. After the user 1 leaves the store, the merchant transaction management system sends bill information to the payment server, and the bill information carries a bill amount, the service provisioning identifier HJK stored in a registered user library, the account information 1 stored in the registered user library, and the merchant identifier 1.

After receiving the bill information, the payment server may first search for the user account 1 and the merchant 1 corresponding to the service identifier HJK, and then determine that the account information 1 matches the user account 1 and the merchant identifier 1 matches the merchant 1, thus determining that the bill information complies with the security policy, and performing a payment operation. If there is any mismatch, it can be determined that the bill information does not comply with the security policy.

In another embodiment, a merchant transaction management system identifier may further be carried in the bill information sent by the merchant transaction management system and the security policy may further include that the merchant transaction management system corresponding to the merchant transaction management system identifier carried in the bill information belongs to the merchant corresponding to the service provisioning identifier.

Still in the above embodiment, if it is assumed that merchant transaction management system identifier B1 is further carried in the bill information sent by the merchant transaction management system, the payment server may determine whether the merchant transaction management system B1 belongs to the merchant 1, and if so, it can determine that the bill information complies with the security policy, and perform a payment operation. If the merchant transaction management system B does not belong to the merchant 1, it can be determined that the bill information does not comply with the security policy.

In some embodiments, if the merchant identifier can be obtained by parsing the identifier of the merchant transaction management system, the merchant transaction management system may not add the merchant identifier into the bill information.

In another embodiment, the security policy further includes that a bill time is within a validity period of the credit transaction service. In this embodiment, when the user provisions the credit transaction service, the user can specify an effective duration of the credit transaction service, for example, 3 months, 6 months, and the like. After receiving the bill information sent by the merchant transaction management system, the payment server may determine whether the bill time is within the validity period of the credit transaction service. If yes, it determines that the bill information complies with the security policy, and if no, it determines that the bill information does not comply with the security policy.

In some embodiments, security detection may be performed in combination with the above security policy, or one or any of the above security policies may be used for security detection. The security detection may be performed by other security policies, which is not limited here.

Based on the above embodiment shown in FIG. 1 or FIG. 3, when determining that the bill payment succeeds, the payment server may positively update the credit information of the user account, for example, input a credit event of the user, increase the credit score of the user account, or the like. In the actual implementation, the credit information may be updated after the bill payment succeeds, or the credit information may be updated at an update time point of the credit information, which is not specially limited in this embodiment.

The payment server may re-perform the payment operation after determining that the bill payment fails. If the bill payment still fails after several times of retrying, the bill information may be sent to the payment client to prompt the user to re-pay.

In one embodiment, if the user does not manually re-pay within a predetermined period of time, the payment server may try to pay automatically again, for example, attempting to deduct again after 24 hours.

In one embodiment, after the bill payment fails, the payment server may also try the automatic payment several times. If the payment fails for all the several times, a payment failure message may be sent to the user, which is not limited in this embodiment.

In this embodiment, if the number of bill payment failures reaches a predetermined number of times, for example, 3 times, 5 times, etc., and the bill is still not paid after a payment due date, the payment server may negatively update the user's credit score, or may add the user into a negative credit list, for example, add the user into a credit blacklist. The payment due date may be set by the merchant, for example, 10 days, 15 days, and the like. In one embodiment, the payment server may also provide the negative credit list to merchants, enterprises, etc. in need to assist the relevant merchants and enterprises to reduce risks.

Based on the above embodiment shown in FIG. 1 or FIG. 3, the payment server may check, periodically or in an event triggering manner, whether the credit information of the user account for which the credit transaction service has been provisioned still meets the condition. If the condition is not met, the payment server may close the credit transaction service of the user account and send a closing notification to the merchant transaction management system and the user. In response to the closing notification, the merchant transaction management system may delete the binding relationship between the account information and the biometric characteristic of the user in the registered user library, or label the binding relationship between the account information and the biometric characteristic as invalid.

The above checking period may be specified by a merchant or a payment server, for example, 1 month, 2 months, and the like. The above event triggering may include updating of the credit information of the user account, and the like.

For example, it is assumed that the condition set by the merchant 1 is that the credit score of the user account is greater than 600. When the credit transaction service is provisioned for the user 1, the credit score of the user account is 601, which meets the condition, so the payment server provisions the credit transaction service oriented for the merchant 1 for the user.

If it is assumed that the payment server subsequently checks and finds that the credit score of the user account of the user 1 is 580, which no longer meets the condition, the payment server may close the credit transaction service oriented for the merchant 1 for the user 1, and notify the merchant transaction management system of the closure. After receiving the notification, the merchant transaction management system may label the binding relationship between the biometric characteristic and the account information of the user 1 in the registered user library as invalid. When the user 1 intends to use the biometric characteristic subsequently to enter the unattended supermarket deployed by the merchant 1, the merchant transaction management system may output prompt information such as "You are not allowed to enter due to a low credit score."

In this embodiment, for the user account for which the credit transaction service has been provisioned, the credit transaction service may be closed when it is found by checking that the credit information of the user account no longer meets the condition, thereby ensuring that only users with credit information complying with the security policy can enjoy services/purchase commodities before payment. Therefore, the safety of the merchant's goods is ensured and the legitimate interests of the merchant are protected.

Figure 4:
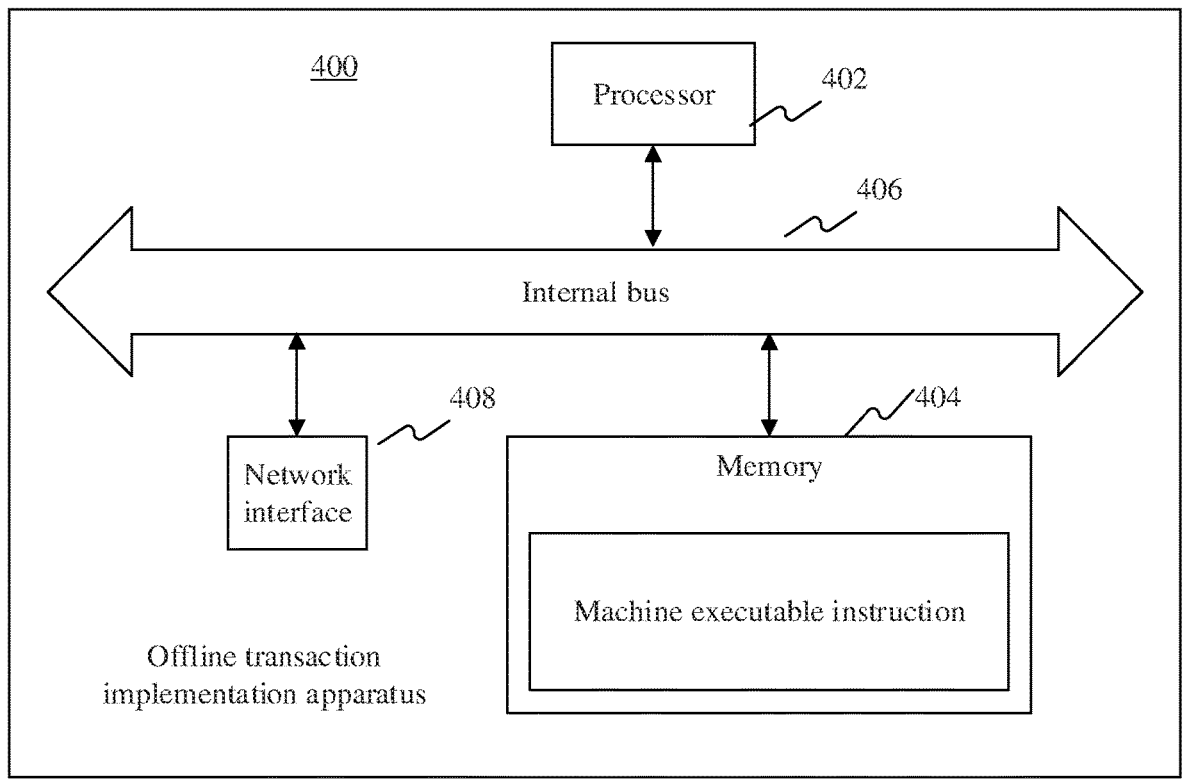
FIG. 4 is a schematic diagram of an offline transaction implementation apparatus according to an exemplary embodiment.

Corresponding to the foregoing embodiments of the offline transaction implementation methods, an offline transaction implementation apparatus 400 is further provided in this specification. Referring to FIG. 4, the offline transaction implementation apparatus 400 includes a processor 402, and a memory 404 configured to store machine executable instructions. The processor 402 and the memory 404 may be connected to each other by an internal bus 406. The offline transaction implementation apparatus 400 may also include a network interface 408 to enable communication with other devices or components. For example, the offline transaction implementation apparatus 400 may implement the merchant transaction management system. Also for example, the offline transaction implementation apparatus 400 may implement the payment server. As another example, the offline transaction implementation apparatus 400 may implement a combination of the merchant transaction management system and the payment server.

The processor 402 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components.

The memory 404 may include any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk.

In this embodiment, the offline transaction implementation apparatus 400 may perform the above described methods by the processor 402 reading and executing machine executable instructions stored in the memory 404. For example, the machine executable instructions may correspond to control logics for implementing an offline transaction, and the processor 402 may perform the following: determining, in response to a request of a user for registering with a credit transaction service of a merchant, whether credit information of a user account meets a condition; provisioning the credit transaction service oriented for the merchant for the user account when determining that the credit information of the user account meets the condition, and sending account information of the user to a merchant transaction management system; receiving bill information sent by the merchant transaction management system, wherein the account information is carried in the bill information; and performing a bill payment operation according to the user account corresponding to the account information.

In one embodiment, by reading and executing the machine executable instructions stored in the memory 404, the processor 402 may further perform the following: returning a message of successful provisioning to a payment client that initiates the credit transaction service provisioning request after provisioning the credit transaction service oriented for the merchant for the user account, and instructing the payment client to guide the user to continue registration in the merchant transaction management system.

In one embodiment, by reading and executing the machine executable instructions stored in the memory 404, the processor 402 may further perform the following: checking whether the bill information complies with a security policy before the bill payment operation is performed according to the user account corresponding to the account information; and performing the bill payment operation if the bill information complies with the security policy.

In one embodiment, by reading and executing the machine executable instructions stored in the memory 404, the processor 402 may further perform the following: returning a service provisioning identifier to the merchant transaction management system when provisioning the credit transaction service oriented for the merchant for the user account, wherein the service provisioning identifier corresponds to the user account and the merchant, for the merchant transaction management system to store a correspondence between the service provisioning identifier and the account information; wherein a merchant identifier and the service provisioning identifier corresponding to the account information are further carried in the bill information; and the security policy includes that the account information carried in the bill information matches the user account corresponding to the service provisioning identifier, and the merchant identifier carried in the bill information matches the merchant corresponding to the service provisioning identifier.

In one embodiment, the merchant transaction management system identifier is further carried in the bill information; and the security policy further includes that the merchant transaction management system corresponding to the merchant transaction management system identifier carried in the bill information belongs to the merchant corresponding to the service provisioning identifier.

In one embodiment, the security policy further includes that the bill time is within a validity period of the credit transaction service.

In one embodiment, by reading and executing the machine executable instructions stored in the memory 404, the processor 402 may further perform the following: positively updating the credit information of the user account if the bill payment succeeds.

In one embodiment, by reading and executing the machine executable instructions stored in the memory 404, the processor 402 may further perform the following: sending the bill information to the payment client if the bill payment fails, for prompting the user to pay again; and/or adding, by the payment server if the number of times of failure of the bill payment reaches a predetermined number of times and the payment has not been made by a payment due date, the user into a negative credit list.

In one embodiment, by reading and executing the machine executable instructions stored in the memory 404, the processor 402 may further perform the following: checking, periodically or in an event triggering manner, whether the credit information of the user account for which the credit transaction service has been provisioned meets the condition; and closing the credit transaction service of the user account if the condition is not met, and sending a closing notification to the merchant transaction management system, for the merchant transaction management system to delete a binding relationship between the account information and biometric characteristic of the user in a registered user library, or label the binding relationship between the account information and the biometric characteristic as invalid.

Corresponding to the foregoing embodiments of the offline transaction implementation methods, a computer-readable storage medium having a computer program stored thereon is also provided. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

When executed by the processor 402 of the apparatus 400, the program on the computer-readable storage medium may cause the apparatus 400 to perform an offline transaction implementation method, the method including: determining, in response to a request of a user for registering with a credit transaction service of a merchant, whether credit information of a user account meets a condition; provisioning the credit transaction service oriented for the merchant for the user account when determining that the credit information of the user account meets the condition, and sending account information of the user to a merchant transaction management system, for the merchant transaction management system to store a binding relationship between the biometric characteristic and the account information into a merchant transaction management system in a registered user library of the merchant after the user inputs the biometric characteristic; receiving bill information sent by the merchant transaction management system, wherein the account information is carried in the bill information; and performing a bill payment operation according to the user account corresponding to the account information.

In one embodiment, the method further includes: returning a message of successful provisioning to a payment client that initiates the credit transaction service provisioning request after provisioning the credit transaction service oriented for the merchant for the user account, and instructing the payment client to guide the user to continue registration in the merchant transaction management system.

In one embodiment, the method further includes: checking whether the bill information complies with a security policy before the bill payment operation is performed according to the user account corresponding to the account information; and performing the bill payment operation if the bill information complies with the security policy.

In one embodiment, the method further includes: returning a service provisioning identifier to the merchant transaction management system when provisioning the credit transaction service oriented for the merchant for the user account, wherein the service provisioning identifier corresponds to the user account and the merchant, for the merchant transaction management system to store a correspondence between the service provisioning identifier and the account information; a merchant identifier and the service provisioning identifier corresponding to the account information are further carried in the bill information; and the security policy includes that the account information carried in the bill information matches the user account corresponding to the service provisioning identifier, and the merchant identifier carried in the bill information matches the merchant corresponding to the service provisioning identifier.

In one embodiment, the merchant transaction management system identifier is further carried in the bill information; and the security policy further includes that the merchant transaction management system corresponding to the merchant transaction management system identifier carried in the bill information belongs to the merchant corresponding to the service provisioning identifier.

In one embodiment, the security policy further includes the fact that the bill time is within a validity period of the credit transaction service.

In one embodiment, the method further includes: positively updating the credit information of the user account if the bill payment succeeds.

In one embodiment, the method further includes: sending the bill information to the payment client if the bill payment fails, for prompting the user to pay again; and/or adding, by the payment server if the number of times of failure of the bill payment reaches a predetermined number of times and the payment has not been made at a payment due date, the user into a negative credit list.

In one embodiment, the method further includes: checking, periodically or in an event triggering manner, whether the credit information of the user account for which the credit transaction service has been provisioned meets the condition; and closing the credit transaction service of the user account if the condition is not met, and sending a closing notification to the merchant transaction management system, for the merchant transaction management system to delete a binding relationship between the account information and biometric characteristic of the user in a registered user library, or label the binding relationship between the account information and the biometric characteristic as invalid.

For details of the process performed by the processor in the above apparatus, reference can be made to the implementation process of the corresponding steps in the above method, and details are not elaborated here.

The apparatus embodiments basically correspond to the method embodiments, and thus related parts can be obtained with reference to the partial description of the method embodiments. The apparatus embodiments described above are merely illustrative.

The apparatus illustrated in the above embodiments may be implemented by a computer chip or an entity, or by a product having a certain function. A typical implementation device is a computer. The specific form of the computer may be a personal computer, a laptop computer, a cellular phone, a camera phone, a smart phone, a personal digital assistant, a media player, a navigation device, an email transceiver device, a game console, a tablet, a wearable device, or a combination of any of these devices.

The specific embodiments of this specification have been described above. Other embodiments fall within the scope of the appended claims. In some cases, actions or steps recited in the claims can be performed in an order that is different from those in the embodiments and the expected results can still be achieved. In addition, the processes depicted in the accompanying drawings are not necessarily required to be in a particular order or a successive order to achieve the expected results. In some embodiments, multitasking and parallel processing may be used.

The above embodiments are merely exemplary, and are not intended to limit this specification. Any modification, equivalent replacement, improvement, and the like within the spirit and principle of this specification shall be included in the scope of protection of this disclosure.

The invention claimed is:

1. An offline transaction implementation method, comprising:
   determining, by a payment server in response to a request of a user for registering with a credit transaction service of a merchant, whether credit information of a user account meets a condition;
   provisioning, by the payment server when determining that the credit information of the user account meets the condition, a credit transaction service of the merchant for the user account, and sending account information of the user to a merchant transaction management system;
   displaying, by the merchant transaction management system after receiving the account information of the user, guidance information on a display screen of the merchant transaction management system to guide the user to input a biometric characteristic;
   storing, by the merchant transaction management system after collecting the biometric characteristic input by the user, a binding relationship between the biometric characteristic and the account information into a registered user library of the merchant, prompting the user that the registration succeeds, and controlling, by the merchant transaction management system, a gate of a store of the merchant to open for allowing the user to walk into the store and to close after the user walks into the store, wherein the store is an unattended store; and
   controlling, by the merchant transaction management system, in response to determining that the user has not left the store by detecting that the gate of the store is not triggered to open from inside of the store, a biometric characteristic collection apparatus to stop collecting user biometric characteristics, to prevent the biometric characteristic collection apparatus from being used by other users to open the gate to enter the store.

2. The method of claim 1, further comprising:
   sending, by the merchant transaction management system after determining that the user has left the store, bill information to the payment server, wherein the account information is carried in the bill information; and
   performing, by the payment server, a bill payment operation according to the user account corresponding to the account information.

3. The method of claim 1, further comprising:
   collecting, by the merchant transaction management system, the biometric characteristic of the user in a non-registration process;
   searching, by the merchant transaction management system, the registered user library for the account information bound to the biometric characteristic;
   controlling, by the merchant transaction management system when the account information bound to the biometric characteristic is found, the gate of the store to open for allowing the user to walk into the store; and
   sending, by the merchant transaction management system after determining that the user has left the store, the bill information to the payment server, wherein the account information bound to the biometric characteristic is carried in the bill information.

4. The method of claim 3, wherein the merchant has a plurality of stores, and the registered user library has identifiers corresponding to the stores; and
   the searching, by the merchant transaction management system, the registered user library for the account information bound to the biometric characteristic comprises:
   searching, by the merchant transaction management system, the registered user library corresponding to the store where the user inputs the biometric characteristic for the account information bound to the biometric characteristic; and
   if the account information bound to the biometric characteristic is not found, searching a registered user library corresponding to another store of the merchant for the account information bound to the biometric characteristic.

5. The method of claim 3, further comprising:
   prompting the user to register, if the account information bound to the biometric characteristic is not found by the merchant transaction management system.

6. The method of claim 5, wherein the prompting the user to register comprises:
   outputting a graphic code on the display screen of the merchant transaction management system, and prompting the user to scan using a payment client, wherein a merchant transaction management system identifier is carried in the graphic code.

7. The method of claim 6, further comprising:
   receiving, by the payment server, a registration request for the credit transaction service of the merchant sent by the payment client after scanning the graphic code, wherein the merchant transaction management system identifier is carried in the credit transaction service registration request, so that the payment server sends the account information of the user to the merchant transaction management system according to the merchant transaction management system identifier when provisioning the credit transaction service of the merchant for the user account.

8. The method of claim 7, further comprising:
   returning, by the payment server after provisioning the credit transaction service of the merchant for the user account, a message of successful provisioning to the payment client, and instructing the payment client to guide the user to continue registration in the merchant transaction management system.

9. The method of claim 2, further comprising:
checking, by the payment server before performing the bill payment operation according to the user account corresponding to the account information, whether the bill information complies with a security policy; and performing the bill payment operation if the bill information complies with the security policy.

10. The method of claim 9, further comprising:
returning, by the payment server when provisioning the credit transaction service of the merchant for the user account, a service provisioning identifier to the merchant transaction management system, wherein the service provisioning identifier corresponds to the user account and the merchant; and
storing, by the merchant transaction management system, a correspondence between the service provisioning identifier and the account information;
wherein a merchant identifier and the service provisioning identifier corresponding to the account information are further carried in the bill information; and
the security policy comprises that the account information carried in the bill information matches the user account corresponding to the service provisioning identifier, and the merchant identifier carried in the bill information matches the merchant corresponding to the service provisioning identifier.

11. The method of claim 10, wherein:
the merchant transaction management system identifier is further carried in the bill information; and
the security policy further comprises that the merchant transaction management system corresponding to the merchant transaction management system identifier carried in the bill information belongs to the merchant corresponding to the service provisioning identifier.

12. The method of claim 9, wherein:
the security policy further comprises that a bill time is within a validity period of the credit transaction service.

13. The method of claim 1, wherein:
determining, by the merchant transaction management system when detecting that the gate of the merchant's store is triggered to open from the inside, that the user leaves the store.

14. The method of claim 2, further comprising:
positively updating the credit information of the user account by the payment server if a bill payment succeeds.

15. The method of claim 2, further comprising at least one of:
sending, by the payment server if a bill payment fails, the bill information to the payment client, for prompting the user to pay again; or
adding, by the payment server if a number of times of failure of the bill payment reaches a predetermined number of times and the bill payment has not been made by a payment due date, the user into a negative credit list.

16. The method of claim 1, further comprising:
checking, by the payment server periodically or in an event triggering manner, whether the credit information of the user account for which the credit transaction service has been provisioned meets the condition;
closing the credit transaction service of the user account if the condition is not met, and sending a closing notification to the merchant transaction management system; and
deleting, by the merchant transaction management system in response to the closing notification, the binding relationship between the account information and the biometric characteristic of the user in the registered user library.

17. The method of claim 1, wherein the condition comprises that a credit score of the user account is greater than or equal to a set score threshold.

18. An offline transaction implementation method, applied to a payment server, comprising:
determining, in response to a request of a user for registering with a credit transaction service of a merchant, whether credit information of a user account meets a condition;
provisioning the credit transaction service of the merchant for the user account when determining that the credit information of the user account meets the condition, and sending account information of the user to a merchant transaction management system of an unattended store of the merchant to allow the user to walk into the store, wherein the merchant transaction management system controls, in response to determining that the user has not left the store by detecting that a gate of the store is not triggered to open from inside of the store, a biometric characteristic collection apparatus to stop collecting user biometric characteristics, to prevent the biometric characteristic collection apparatus from being used by other users to open the gate to enter the store;
receiving bill information sent by the merchant transaction management system, wherein the account information is carried in the bill information; and
performing a bill payment operation according to the user account corresponding to the account information.

19. An offline transaction implementation method, applied to a merchant transaction management system, comprising:
receiving account information of a user sent by a payment server after provisioning a credit transaction service of a merchant for a user account in response to a request of the user for registering with the credit transaction service of the merchant;
displaying guidance information on a display screen of the merchant transaction management system to guide the user to input a biometric characteristic, after receiving the account information of the user;
storing a binding relationship between the biometric characteristic and the account information into a registered user library of the merchant after collecting the biometric characteristic input by the user, prompting the user that the registration succeeds, and controlling a gate of a store of the merchant to open for allowing the user to walk into the store and to close after the user walks into the store, wherein the store is an unattended store; and
controlling, in response to determining that the user has not left the store by detecting that the gate of the store is not triggered to open from inside of the store, a biometric characteristic collection apparatus to stop collecting user biometric characteristics, to prevent the biometric characteristic collection apparatus from being used by other users to open the gate to enter the store.

* * * * *